US010681119B2

(12) United States Patent
Horstmann et al.

(10) Patent No.: US 10,681,119 B2
(45) Date of Patent: Jun. 9, 2020

(54) ESTABLISHING NODES FOR GLOBAL ROUTING MANAGER

(71) Applicant: McAfee, LLC, Santa Clara, CA (US)

(72) Inventors: Ralf Horstmann, Paderborn (DE);
Juergen Kendzorra, Paderborn (DE);
Pavan Kumar Madikonda, Paderborn (DE); Andre Stein, Paderborn (DE);
Martin Stecher, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 16/112,505

(22) Filed: Aug. 24, 2018

(65) Prior Publication Data

US 2018/0367606 A1  Dec. 20, 2018

Related U.S. Application Data

(63) Continuation of application No. 14/929,277, filed on Oct. 31, 2015, now Pat. No. 10,063,419.

(51) Int. Cl.
*H04L 29/08* (2006.01)
*H04L 29/12* (2006.01)
*H04L 12/26* (2006.01)

(52) U.S. Cl.
CPC ........ *H04L 67/1021* (2013.01); *H04L 61/609* (2013.01); *H04L 67/1008* (2013.01); *H04L 43/08* (2013.01)

(58) Field of Classification Search
None
See application file for complete search history.

(56) References Cited

U.S. PATENT DOCUMENTS

| 5,894,479 | A | 4/1999 | Mohammed |
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 2004/0006615 | A1 | 1/2004 | Jackson |
| 2010/0115133 | A1 | 5/2010 | Joshi |
| 2011/0276718 | A1* | 11/2011 | Steiner ............. H04L 45/124 709/241 |
| 2012/0023153 | A1* | 1/2012 | Karasaridis ....... H04L 61/1511 709/203 |
| 2012/0215915 | A1 | 8/2012 | Sakata et al. |

(Continued)

FOREIGN PATENT DOCUMENTS

WO    2017074603 A1    5/2017

OTHER PUBLICATIONS

PCT Dec. 28, 2016 International Search Report and Written Opinion in International Application No. PCT/US2016/052397, dated Dec. 28, 2016, 13 pages.

(Continued)

*Primary Examiner* — Brian Whipple
(74) *Attorney, Agent, or Firm* — Patent Capital Group

(57) ABSTRACT

Embodiments of the present disclosure include an Orchestrator to commission a point of presence (PoP) node based on receiving an internet protocol (IP) address, the IP address associated with a geographic location; and a global routing manager for assigning a client device to a PoP node based on the received IP address. Embodiments also include a performance manager to acquire performance information about each PoP node.

18 Claims, 6 Drawing Sheets

(56) References Cited

U.S. PATENT DOCUMENTS

| | | |
|---|---|---|
| 2012/0233308 A1 | 9/2012 | Van De Houten et al. |
| 2013/0231132 A1 | 9/2013 | Huang et al. |
| 2013/0272253 A1 | 10/2013 | Veenstra et al. |
| 2014/0022951 A1 | 1/2014 | Lemieux |
| 2014/0047061 A1 | 2/2014 | Ehrlich et al. |
| 2015/0043578 A1 | 2/2015 | Fidler et al. |
| 2017/0126502 A1 | 5/2017 | Horstmann et al. |

OTHER PUBLICATIONS

PCT May 11, 2018 International Preliminary Report on Patentability from International Application No. PCT/US2016/052397, dated May 11, 2018, 12 pages.

\* cited by examiner

ESTABLISHING NODES FOR GLOBAL ROUTING MANAGER

CROSS-REFERENCE TO RELATED APPLICATION

This Application is a continuation (and claims the benefit of priority under 35 U.S.C. § 120) of U.S. application Ser. No. 14/929,277, filed Oct. 31, 2015, entitled "ESTABLISHING NODES FOR GLOBAL ROUTING MANAGER," Inventors, Ralf Horstmann, et al. The disclosure of the prior application is considered part of (and are incorporated in its entirety by reference in) the disclosure of this application.

TECHNICAL FIELD

This disclosure relates in general to the field of computer security and, more particularly, to establishing new nodes for a global routing manager.

BACKGROUND

Productive web services include HTTP proxies that each currently reside in a data center behind a load balancer. Data centers are large, complex, and expensive, the result being few data centers distributed over the world. Because data centers are so distributed, a client may be a long distance from where the next data center resides, resulting in high latency. It would be prohibitively expensive to provide a full blown data center within a reasonable geographical radius to every client using the web services. Furthermore, out-bound IP address that the data center uses tend to be located in the country where the data center resides.

BRIEF DESCRIPTION OF THE DRAWINGS

Like reference numbers and designations in the various drawings indicate like elements.

DETAILED DESCRIPTION OF EXAMPLE EMBODIMENTS

This disclosure is directed to establishing point of presence (PoP) of web gateway platforms as close to the customer as possible. To that end, this disclosure describes establishing or identifying, on demand, point of presence (PoP nodes) nodes based on client demands and policies. This disclosure also describes providing localization in connection with customer-specific policies, including data residency requirements, traffic efficiency, localization of web traffic (that traffic remains in same language), etc.

With automation, new PoP nodes can be established quickly in various locations around the world, which can provide lower latency and provide out-bound IP addresses with the right IP addresses for geolocation. As in-session migration from a PoP node that provides filtering or other security services to another PoP node may be undesirable, the present disclosure describes a global routing manager to facilitate accurate initial client device assignments to a PoP node to minimize migrations of the client device to a different PoP node (during a session). In this content, the term accurate implies that the PoP node assigned to a client device is consistent with client policies, quality of service requirements, location, etc.

Additionally, PoP nodes can be de-commissioned based on low usage or low quality of service.

Figure 1:
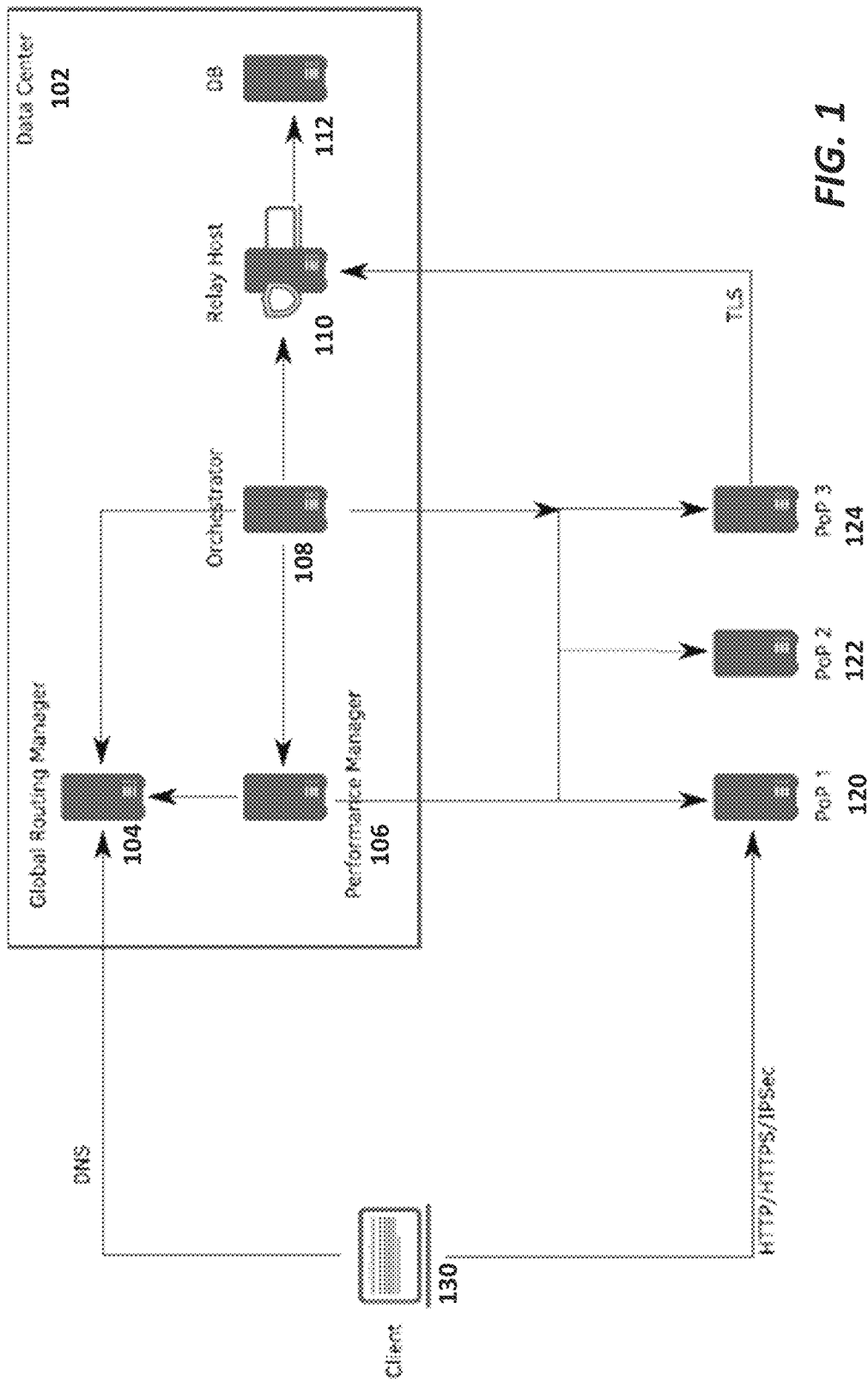
FIG. 1 is a schematic block diagram of a system for assigning point of presence nodes, in accordance with embodiments of the present disclosure.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 1 is a schematic block diagram of a system 100 for assigning point of presence nodes, in accordance with embodiments of the present disclosure. System 100 includes a data center 102. Data center 102 includes a global routing manager 104, an Orchestrator 108, and a performance manager 106. Data center 102 also includes a relay host 110 and one or more databases 112.

The system 100 provides extensible web filtering points of presence nodes (PoP nodes) 120, 122, 124, that are local (or at least geographically proximate) to customers' (potentially multiple) sites. Each PoP node serves as a stand-in for the data center 102, with the exception of the policy database and supporting logic that remain provided by support systems located at the data center 102.

To provide these extensible platform of PoP nodes, a global routing manager (GRM) 104 and Orchestrator 108 manage both the commissioning and decommissioning of the PoP nodes (on-demand), as well as the proper traffic routing of individual client devices 130 of a customer to a respective one of the currently provisioned PoP nodes (e.g., PoP nodes 120-124). The performance manager 106 can receive performance information and relay performance information to the GRM 104 for use in assigning clients to PoP nodes.

PoP node 120 provides web filtering and potentially also (or alternatively) data loss prevention, email filtering, and other security services. Because these PoP nodes are geographical local, the PoP nodes are able to support customers' localization policies and preferences. PoP nodes can be located at physical locations proximate the client's geographic location. For example, a PoP node can be created on a hosted server at a third-party data center or other service provider location. A PoP node can also be virtual, in which case, a cloud-based PoP node can emulate functionality as if the PoP node were localized to the client. Localization, however, is beneficial to reducing latency.

Figure 2:
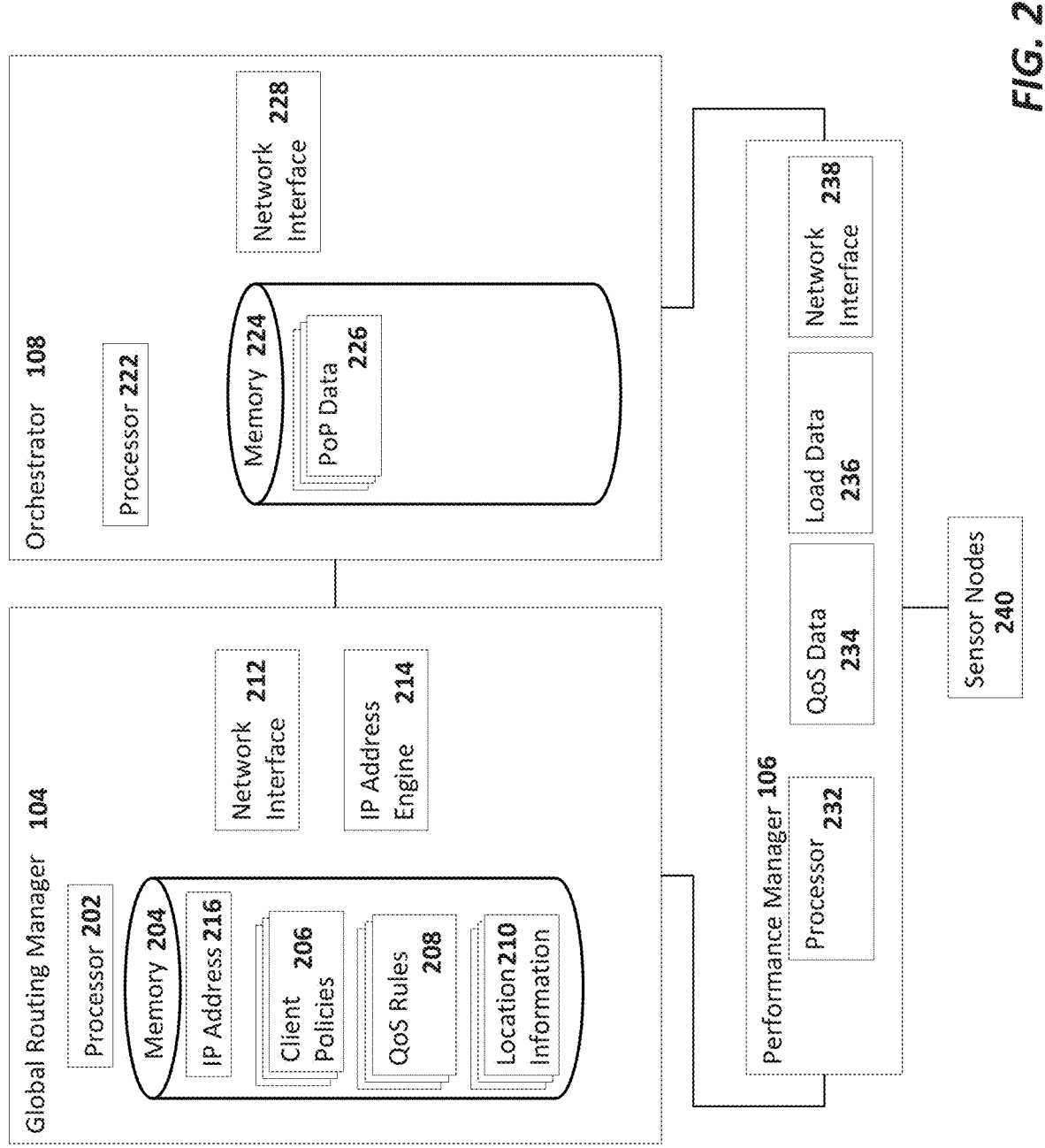
FIG. 2 is a schematic block diagram of a global routing manager, an Orchestrator, and a performance manager, in accordance with embodiments of the present disclosure.

FIG. 2 is a schematic block diagram of a global routing manager 104, an Orchestrator 108, and a performance manager 106, in accordance with embodiments of the present disclosure.

The global routing manager (GRM) 104 includes a processor 202, which can be a hardware processor, a software processor, or a combination of hardware and software. GRM 104 can also include a memory 204 for storing instructions and information used by the processor 202, including IP address information 216, client policies 206, quality of service rules 208, and location information 210. The GRM 104 also includes an IP address engine 214 for receiving IP address information across network interface 212 and identifying and/or assigning clients to PoP nodes based on the received IP address.

GRM 104 can use incoming IP address information for the client device received via network interface 212. The IP address engine 214 can identify an existing PoP node or request a new PoP node close to the client device's IP address based on, e.g., IP Address information 216 and location information 210. The GRM 104 can assign client devices to a respective one of the PoP nodes based on one or more of client policies 206, a system policy for quality of service 208, performance information such as load 236 or QoS rules 210 (working in conjunction with performance manager 106), and location information 210. GRM 104 can receive a request for web services from a client devices 130 across, e.g., a domain name system (DNS) connection. The request for web services by the client devices 130 can cause the GRM 104 to start the process of commissioning a PoP node for the client device 130.

The GRM 104 effectively balances the load of client traffic across multiple PoP nodes. Unlike load balancing within content delivery, each client-to-PoP assignment is "sticky," as in-session migration from a PoP node that provides filtering or other security services to another PoP node may be undesirable.

Accordingly, the GRM 104 considers not only geographical proximity of a given client to a particular PoP node, but also the load at each PoP and the estimated quality of service that will be provided. In some embodiments, the GRM 104 considers not only a single client device, but a collection of client devices consuming the PoP nodes' services. The analysis performed by the GRM 104 is more involved than in other load balancing applications where stickiness is less critical (e.g., in content server load balancing). For example, the GRM 104 takes into account customer preferences in addition to quality of service and latency for assignments of PoPs to client devices. The GRM 104 can specify, per DNS name, which PoP nodes are selected for assignment to a client.

In addition, the GRM 104 can also make client-to-PoP assignments based on customer specific preferences and policies 206. For example, a customer may want certain client devices to use a PoP node in a particular region of a country or in a home country if the client device is being used outside the home country.

A Performance Manager 106 can monitor and provide information relating to availability of given PoP nodes and load 236, quality of service 234, and other metric information received from each PoP node across network interface 238. The Performance Manager 106 shares this information with the GRM 104 for use in client-to-PoP assignment decisions. The GRM 104, in turn, makes commissioning/decommissioning requests of the Orchestrator 108 based on the current load and needs determined from the performance information delivered by the Performance Manager 106.

This exchange can result in additional PoP node instances being commissioned or decommissioned based on real time (or predicted) demand and quality of service. The three components (GRM 104, Performance Manager 106, and Orchestrator 108) work together to provide an optimized and elastic collection of PoP nodes compliant with a given customer's requirements.

In some embodiments, performance information is provided as feedback from client devices. In some embodiments, sensor node 230 works in concert with the Performance Manager to gauge performance of individual PoP nodes. The sensor node 230 acts as client devices interact with the PoP nodes that have been provisioned to determine latency, throughput, roundtrip, trends, and other QoS metrics. These sensor nodes 230 can also be provided to monitor latency among the potentially multiple GRMs as well as DNS request latency and other metrics.

The Orchestrator 108 is configured to commission and decommission each of the customer's PoP nodes. Two scenarios for commissioning a PoP node are described herein: 1) commissioning a hardware node as a PoP and 2) commissioning a virtual node as a PoP via an elastic cloud provider with a provisioning application programming interface (API).

For commissioning a hardware node as a PoP, the hardware node is configured to provide the desired PoP services. An operating system, such as a Linux operating system, can be installed into a server with, e.g., a secure shell (SSH) or OpenSSH daemon running. The access credentials for the user can be introduced into the Orchestrator by the global routing manager and the application stack for the desired web functionality is built on the server by the Orchestrator automatically. The application stack can include applications and other functions to provide the client device with the type of web services requested at the level of security authorized by the credentials provided by the client device.

The credentials are associated with the client device (or the client operating a client device, such as a user), and can include a user name and access credentials, as well as security level authorization, policies and rules, and other access information. The credentials can be provided by the client device to the global routing manager across the DNS link when the client device requests access to web services.

For commissioning a virtual node as a PoP, an interface in the Orchestrator can be provided that communicates with an elastic cloud provider's API to create a virtual node with characteristics of a desired operating system and secure shell (SSH) access credentials. A manual step (e.g., by a user operating the client device) is not required to enter user credentials into the system to authorize the web access requested. Instead, the user credentials can be communicated through the DNS connection from the client device to the GRM, and the GRM can provide the user credentials to the Orchestrator to commission the PoP node.

The Orchestrator can then build an application stack at the virtual node based on the user credentials. Once the application stack has been built on the PoP node and automated tests have been completed, the information about the new PoP nodes along with meta information (location, capacity, available features like IPsec) is distributed automatically to all GRMs. The virtual node can then be assigned as a PoP to the client device (and to other client devices that may request similar web services that use the applications built into the application stack).

In some implementations, the provisioned nodes can be interconnected to form a quasi-mesh network between provisioned PoP nodes. This interconnectivity can be either between PoP nodes of a single customer or across customer boundaries. Interconnectivity between PoP nodes can assist with traffic hand-offs between PoP nodes or service hand offs (e.g., when one PoP provides services that another does not, traffic could be forwarded to this PoP to allow these services to also be provided on the traffic).

Figure 3:
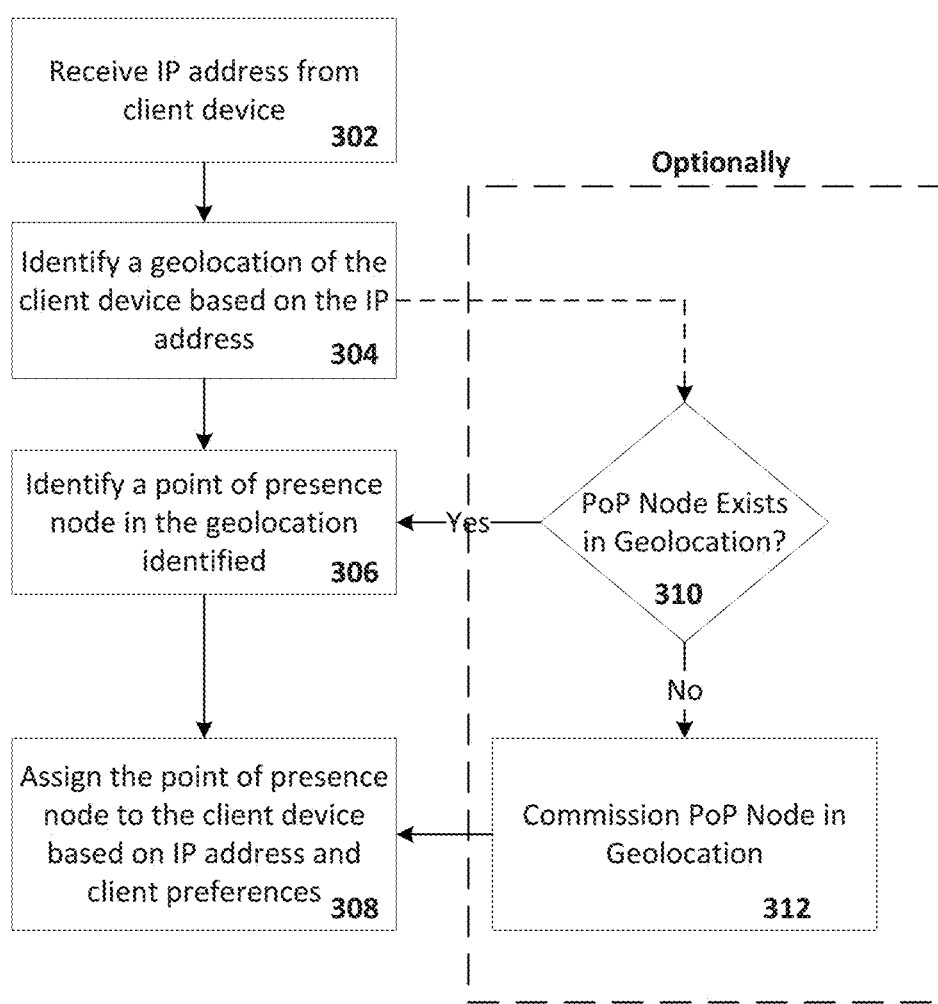
FIG. 3 is a process flow diagram for assigning point of presence nodes, in accordance with embodiments of the present disclosure.

FIG. 3 is a process flow diagram 300 for assigning point of presence nodes, in accordance with embodiments of the present disclosure. A global routing manager can receive a proxy request from a client device, the proxy request including an IP address for the client device (302). The global routing manager can identify a location of the IP address for the client device (304). The global routing manager can identify one or more point of presence nodes (PoP nodes) to assign to the client device (306). The PoP nodes assigned may include an IP address that is in the same geolocation as the received IP address; or, the PoP node can be identified based on other client preferences or policies. The global routing manager can assign one of the one or more PoP nodes to the client device (308).

In some instances, the global routing manager can determine whether or not a suitable PoP node exists to service the client proxy request (310). If there is an existing PoP node, the global routing manager can identify the appropriate PoP node (306) and assign the PoP node to the client device (308). In some instances, the global routing manager determines that there is not a suitable PoP node to service the client request (310). In that case, the global routing manager can request that the Orchestrator commission a new PoP node that satisfies client preferences and policies, including out-bound IP address preferences 312). The global routing manager can then assign the client device to the newly commissioned PoP node.

Figure 4:
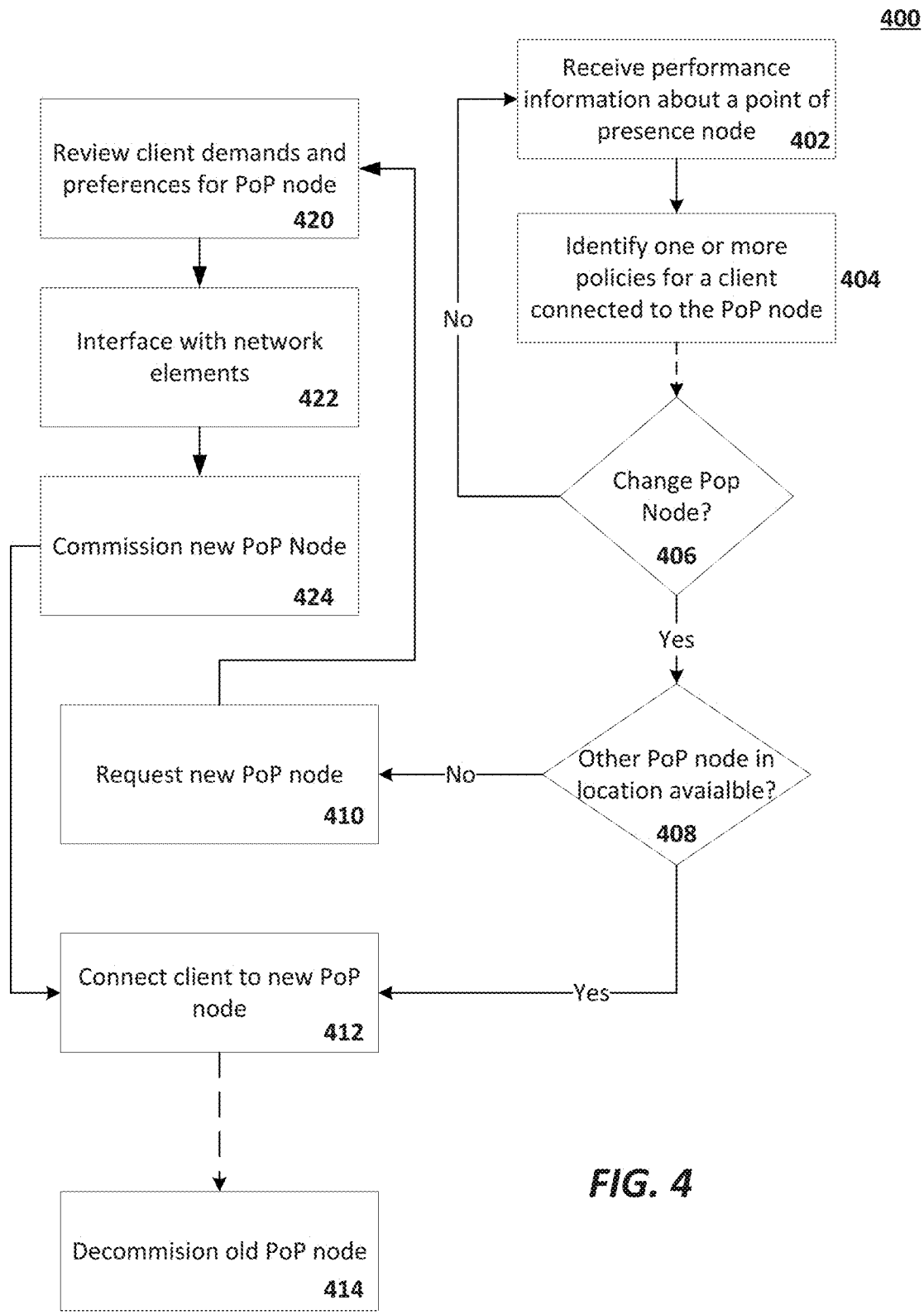
FIG. 4 is a process flow diagram for using performance information to handover clients to new point of presence nodes, in accordance with embodiments of the present disclosure.

FIG. 4 is a process flow diagram 400 for using performance information to handover clients to new point of presence nodes, in accordance with embodiments of the present disclosure. In some embodiments, the global routing manager can receive performance information about a point of presence node (PoP node) (402). For example, the global routing manager can receive load information, quality of service information, migration information, stability information, etc., from a performance manager node. The global routing manager can use the performance information to determine whether to reassign a client device to a different PoP node (406). For example, the global routing manager can cross reference performance information against client policies and preferences, as well as quality of service targets (404), to determine whether to reassign the client device to a new PoP node (406). If no reassignments are necessary, the global routing manager can continue monitoring performance information received from the performance manager (402).

If, however, the global routing manager determines that a reassignment is needed, the global routing manager can determine whether existing PoP nodes are suitable for the client device to switch to (408). For example, if an existing PoP node that satisfies the client's quality of service requirements, geolocation preferences, IP address location preferences, and/or service preferences (e.g., web filtering, firewall, etc.) can be identified by the global routing manager, then the global routing manager can reassign the client device to this different PoP node (412).

If, however, the global routing manager determines that no suitable PoP nodes exist for the client device, the global routing manager can request the commissioning of a new PoP node from the Orchestrator (410). The Orchestrator can establish a new PoP node by considering client preferences and policies, geolocation, and service demands (420). The Orchestrator can then commission a new PoP node by interfacing with network elements, including third party hosted servers or cloud-based platforms (422). The Orchestrator can then commission a new PoP node that satisfies the client preferences and demands (424). After the new PoP node is commissioned, the global routing manager can reassign the client device to the new PoP node (412).

In some instances, the Orchestrator can decommission old, non-functioning, or unused PoP nodes, either on-demand from the global routing manager or on its own volition (414).

In general, "servers," "devices," "computing devices," "host devices," "user devices," "clients," "servers," "computers," "systems," etc., can include electronic computing devices operable to receive, transmit, process, store, or manage data and information associated with the computing environment. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host and user devices, including some implementations of gateway devices, can further include computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device. A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software. It will be understood that there may be any number of host devices, as well as any number of host devices. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Aspects of the embodiments are directed to a system that includes at least one processor device and at least one memory element. The system also includes an Orchestrator to commission a point of presence (PoP) node based on receiving an internet protocol (IP) address, the IP address associated with a geographic location; and a global routing manager for assigning a client device to a PoP node based on the received IP address.

Aspects of the embodiments are directed to at least one machine accessible storage medium having instructions stored thereon, the instructions when executed on a machine, cause the machine to commission a point of presence (PoP) node based on receiving an internet protocol (IP) address, the IP address associated with a geographic location; and assigning a client device to a PoP node based on the received IP address.

In some embodiments, the PoP is a web-filtering PoP.

In some embodiments, the global routing manager assigns the client device to a PoP node based on a load balancing between PoP nodes associated with the geographic location.

In some embodiments, a performance manager acquires load information about each PoP node.

In some embodiments, the global routing manager uses the load information from the performance manager to reassign clients to a different PoP node for load balancing.

In some embodiments, the global routing manager uses the load information to determine that a PoP node is overloaded and to make a request to the Orchestrator to commission a new PoP node in the geographic location.

In some embodiments, the Orchestrator commissions a new PoP node based on a request from the global routing manager and the load information from the performance manager.

In some embodiments, the global routing manager uses the load information to determine that a PoP node is underloaded, and makes a request to the Orchestrator to decommission the PoP node that is underloaded.

In some embodiments, the global routing manager uses the load information from the performance manager to determine how to assign a client device to a PoP node.

In some embodiments, the global routing manager assigns a client device to a PoP node based on a policy or preference associated with the client device.

In some embodiments, the global routing manager identifies a PoP node based on a proxy request from a client, the proxy request comprising the IP address, and wherein the global routing manager assigns an IP address to the client based on the geolocation of the PoP node.

In some embodiments, the policy or preference associated with the client device comprises assigning to the client device an IP address geolocated within a home area of the client device.

In some embodiments, the policy or preference associated with the client device comprises assigning to the client device an IP address geolocated in an area proximate the PoP node.

In some embodiments, the policy or preference associated with the client device comprises assigning to the client device a PoP node with a specified minimum quality of service.

In some embodiments, one or more sensor nodes, the sensor nodes monitor each PoP node and provide information to the performance manager, the information comprising one or more of load information, quality of service, latency, or throughput.

In some embodiments, the Orchestrator coordinates between PoP nodes associated with a customer to facilitate handoff between PoP nodes associated with the customer.

In some embodiments, the PoP nodes handoff clients based on load balancing requirements, service offerings, or both.

In some embodiments, the instructions further cause a machine to a PoP node based on a load balancing between PoP nodes associated with the geographic location.

In some embodiments, the instructions are further operable when executed to acquire load information about each PoP node.

In some embodiments, wherein the instructions are further operable when executed to reassign clients to a different PoP node for load balancing based on the load information.

In some embodiments, wherein the instructions are further operable when executed to determine that a PoP node is overloaded based on the load information and request commissioning of a new PoP node in the geographic location.

In some embodiments, wherein the instructions are further operable when executed to assign a client device to a PoP node based on a policy or preference associated with the client device.

In some embodiments, wherein the instructions are further operable when executed to coordinate between PoP nodes associated with a customer to facilitate handoff between PoP nodes associated with the customer.

Aspects of the embodiments are directed to a computer implemented method. The method includes receiving a proxy request from a client, the proxy request comprising an Internet Protocol (IP) address from a client device; identifying a point of presence node (PoP node) in a location based on the received IP address; and assigning the client device to the identified PoP node.

In some embodiments, the method includes receiving load information about one or more PoP nodes; and assigning PoP nodes to client devices based on the load information about the one or more PoP nodes.

In some embodiments, the method includes determining that a PoP node is overloaded based on the received load information; and reassigning the client device to a new PoP node in a same geographic location of the overloaded PoP node.

In some embodiments, the method includes assigning the client device to the PoP node based on a policy or preference associated with the client device.

In some embodiments, the policy or preference associated with the client device comprises assigning to the client device an IP address geolocated within a home area of the client device.

In some embodiments, the policy or preference associated with the client device comprises assigning to the client device an IP address geolocated in an area proximate the PoP node.

In some embodiments, the policy or preference associated with the client device comprises assigning to the client device a PoP node with a specified minimum quality of service.

Aspects of the embodiments are directed to a global routing manager. The global routing manager includes means for identifying a point of presence node (PoP node) based on a received proxy request. The global routing manager may also include means for assigning a PoP node to a client device based on the IP address of the received proxy request.

In some embodiments, the global routing manager can include means for assigning a PoP node to a client device based on one or more of a client policy or preference, performance information of existing PoP nodes, and/or geolocation policies.

In some embodiments, the global routing manager can include means for requesting the commissioning of a new PoP node and assigning the client device to the new PoP node.

In some embodiments, the global routing manager can reassign a client device to a different PoP node based on performance information of a first PoP node, based on client migration, or on other factors.

Aspects of the embodiments are directed to an Orchestrator that includes means for commissioning and/or decommissioning point of presence nodes (PoP nodes) on demand. For example, an Orchestrator can commission a new PoP node based on a request from a global routing manager. The Orchestrator can also decommission a PoP node based on a request from the global routing manager or based on usage information received from other sources, such as from a performance manager.

Figure 6:
FIG. 6 is a schematic block diagram of an example client device in accordance with embodiments of the present disclosure.
Figure 5:
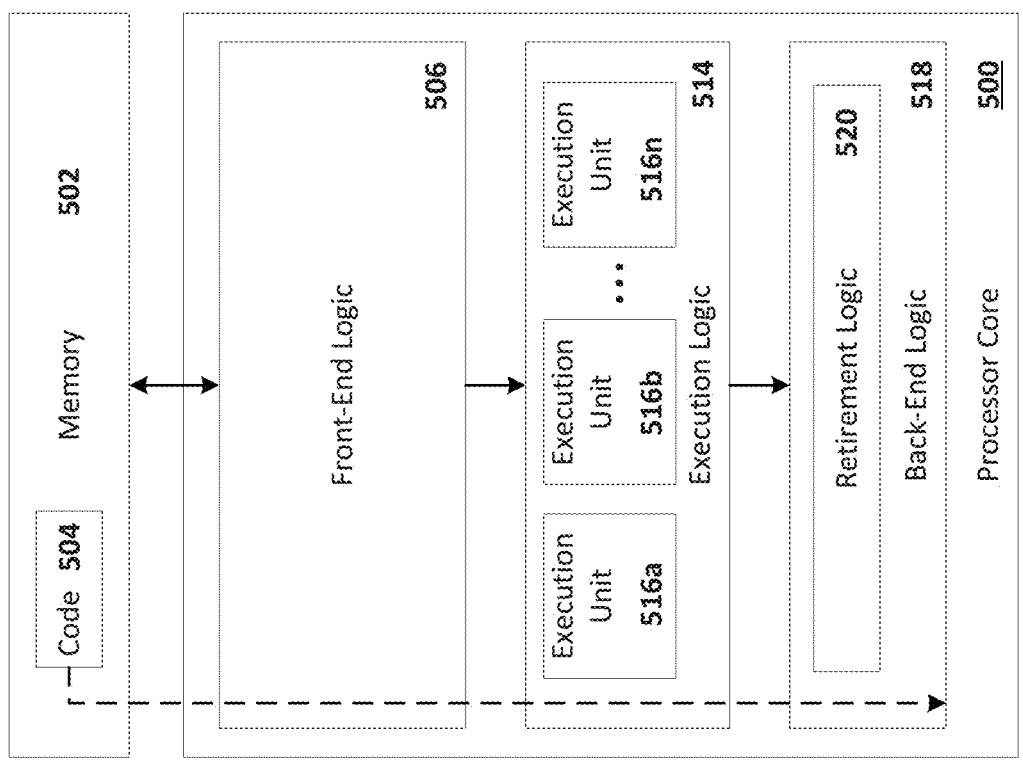
FIG. 5 is a schematic block diagram of an example processor in accordance with embodiments of the present disclosure.
Figure 7:
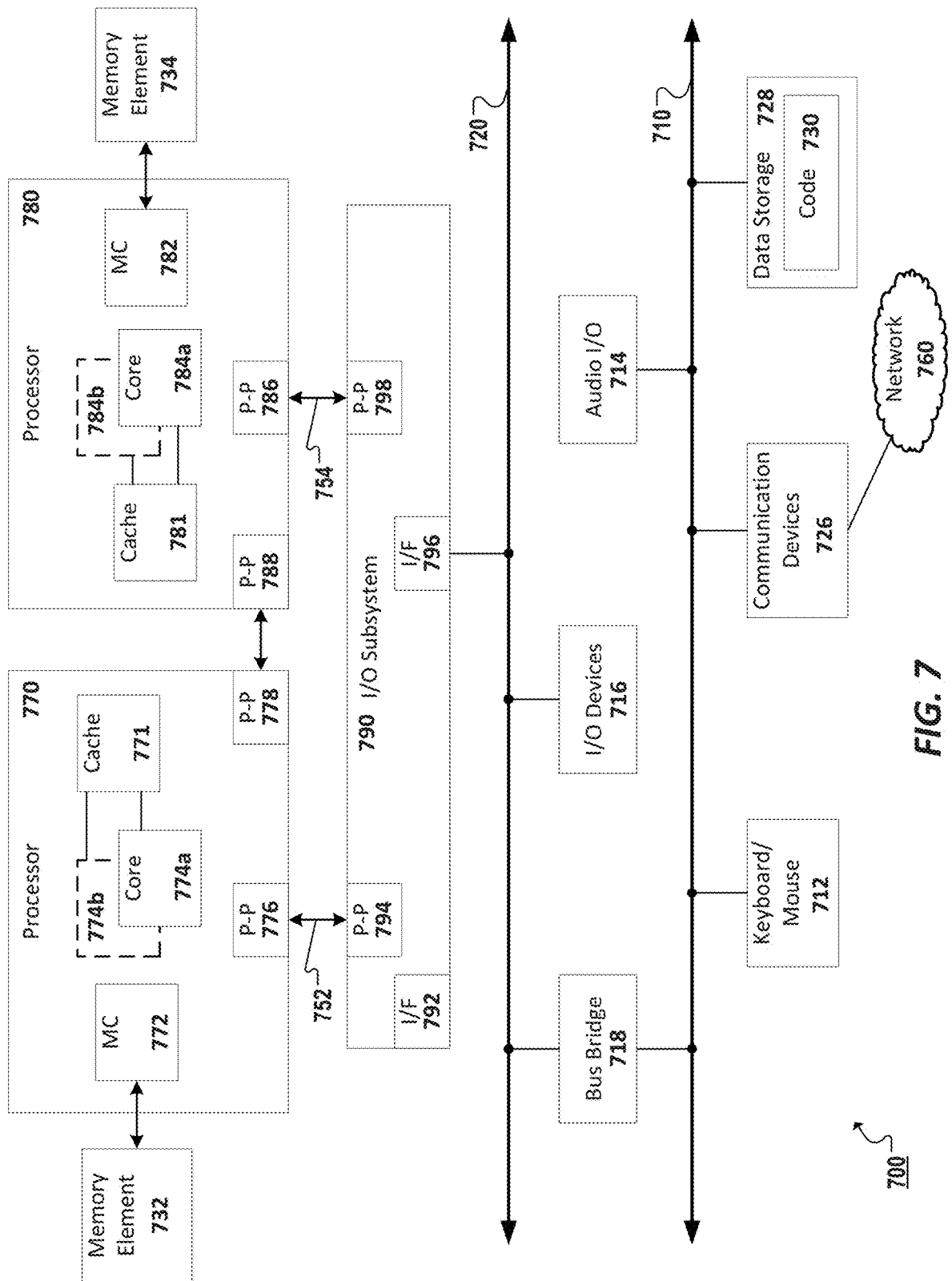
FIG. 7 is a schematic block diagram of a computing system 700 according to an embodiment.

FIGS. 5-7 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 5-7.

FIG. 5 is an example illustration of a processor according to an embodiment. Processor 500 is an example of a type of hardware device that can be used in connection with the implementations above.

Processor 500 may be any type of processor, such as a microprocessor, an embedded processor, a digital signal processor (DSP), a network processor, a multi-core processor, a single core processor, or other device to execute code. Although only one processor 500 is illustrated in FIG. 5, a processing element may alternatively include more than one of processor 500 illustrated in FIG. 5. Processor 500 may be a single-threaded core or, for at least one embodiment, the processor 500 may be multi-threaded in that it may include more than one hardware thread context (or "logical processor") per core.

FIG. 5 also illustrates a memory 502 coupled to processor 500 in accordance with an embodiment. Memory 502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 500 can execute any type of instructions associated with algorithms, processes, or operations detailed herein. Generally, processor 500 can transform an element or an article (e.g., data) from one state or thing to another state or thing.

Code 504, which may be one or more instructions to be executed by processor 500, may be stored in memory 502, or may be stored in software, hardware, firmware, or any suitable combination thereof, or in any other internal or external component, device, element, or object where appropriate and based on particular needs. In one example, processor 500 can follow a program sequence of instructions indicated by code 504. Each instruction enters a front-end logic 506 and is processed by one or more decoders 508. The decoder may generate, as its output, a micro operation such as a fixed width micro operation in a predefined format, or may generate other instructions, microinstructions, or control signals that reflect the original code instruction. Front-end logic 506 also includes register renaming logic 510 and scheduling logic 512, which generally allocate resources and queue the operation corresponding to the instruction for execution.

Processor 500 can also include execution logic 514 having a set of execution units 516a, 516b, 516n, etc. Some embodiments may include a number of execution units dedicated to specific functions or sets of functions. Other embodiments may include only one execution unit or one execution unit that can perform a particular function. Execution logic 514 performs the operations specified by code instructions.

After completion of execution of the operations specified by the code instructions, back-end logic 518 can retire the instructions of code 504. In one embodiment, processor 500 allows out of order execution but requires in order retirement of instructions. Retirement logic 520 may take a variety of known forms (e.g., re-order buffers or the like). In this manner, processor 500 is transformed during execution of code 504, at least in terms of the output generated by the decoder, hardware registers and tables utilized by register renaming logic 510, and any registers (not shown) modified by execution logic 514.

Although not shown in FIG. 5, a processing element may include other elements on a chip with processor 500. For example, a processing element may include memory control logic along with processor 500. The processing element may include I/O control logic and/or may include I/O control logic integrated with memory control logic. The processing element may also include one or more caches. In some embodiments, non-volatile memory (such as flash memory or fuses) may also be included on the chip with processor 500.

Referring now to FIG. 6, a block diagram is illustrated of an example mobile device 600. Mobile device 600 is an example of a possible computing system (e.g., a host or endpoint device) of the examples and implementations described herein. In an embodiment, mobile device 600 operates as a transmitter and a receiver of wireless communications signals. Specifically, in one example, mobile device 600 may be capable of both transmitting and receiving cellular network voice and data mobile services. Mobile services include such functionality as full Internet access, downloadable and streaming video content, as well as voice telephone communications.

Mobile device 600 may correspond to a conventional wireless or cellular portable telephone, such as a handset that is capable of receiving "3G", or "third generation" cellular services. In another example, mobile device 600 may be capable of transmitting and receiving "4G" mobile services as well, or any other mobile service.

Examples of devices that can correspond to mobile device 600 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 600 illustrated in FIG. 6 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 600 includes a transceiver 602, which is connected to and in communication with an antenna. Transceiver 602 may be a radio frequency transceiver. Also, wireless signals may be transmitted and received via transceiver 602. Transceiver 602 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 602 is connected to a processor 604, which may perform the bulk of the digital signal processing of signals to be communicated and signals received, at the baseband frequency. Processor 604 can provide a graphics interface to a display element 608, for the display of text, graphics, and video to a user, as well as an input element 610 for accepting inputs from users, such as a touchpad, keypad, roller mouse, and other examples. Processor 604 may include an embodiment such as shown and described with reference to processor 500 of FIG. 5.

In an aspect of this disclosure, processor 604 may be a processor that can execute any type of instructions to achieve the functionality and operations as detailed herein. Processor 604 may also be coupled to a memory element 606 for storing information and data used in operations performed using the processor 604. Additional details of an example processor 604 and memory element 606 are subsequently described herein. In an example embodiment, mobile device 600 may be designed with a system-on-a-chip (SoC) architecture, which integrates many or all components of the mobile device into a single chip, in at least some embodiments.

FIG. 7 is a schematic block diagram of a computing system 700 according to an embodiment. In particular, FIG. 7 shows a system where processors, memory, and input/output devices are interconnected by a number of point-to-point interfaces. Generally, one or more of the computing systems described herein may be configured in the same or similar manner as computing system 700.

Processors 770 and 780 may also each include integrated memory controller logic (MC) 772 and 782 to communicate with memory elements 732 and 734. In alternative embodiments, memory controller logic 772 and 782 may be discrete logic separate from processors 770 and 780. Memory elements 732 and/or 734 may store various data to be used by processors 770 and 780 in achieving operations and functionality outlined herein.

Processors 770 and 780 may be any type of processor, such as those discussed in connection with other figures. Processors 770 and 780 may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory, machine accessible storage medium having instructions stored thereon, wherein the instructions, when executed on a machine, cause the machine to perform a method comprising:
   receiving a request including an internet protocol (IP) address of a device;
   identifying a geographic location of the device, at least in part based on the IP address;
   commissioning on demand a point of presence (PoP) node of a web gateway platform, wherein the PoP node provides web filtering, data loss prevention, email filtering, or another security service;
   acquiring load information about another PoP node, the commissioning at least in part based on the load information; and
   assigning the device to the PoP node, at least in part based on the load information.

2. The medium of claim 1, wherein the assigning assigns the device to the PoP node at least in part based on a client policy.

3. The medium of claim 1, wherein the commissioning commissions the PoP node at least in part based on a quality of service.

4. The medium of claim 3, wherein the quality of service includes one metric of a group of metrics consisting of: latency, throughput, and roundtrip.

5. The medium of claim 1, the method further comprising:
   receiving performance information as feedback from the device, wherein the assigning assigns the device to the PoP node at least in part based on the performance information.

6. The medium of claim 1, wherein the PoP node is virtual or cloud-based.

7. A system, comprising:
   at least one network interface that receives a request including an internet protocol (IP) address of a device; and
   at least one processor configured to identify a geographic location of the device, at least in part based on the IP address,
   the at least one processor configured to commission on demand a point of presence (PoP) node of a web gateway platform, wherein the PoP node provides web filtering, data loss prevention, email filtering, or another security service, and
   the at least one processor configured to acquire load information about another PoP node, the commissioning at least in part based on the load information, and to assign the device to the PoP node, at least in part based on the load information.

8. The system of claim 7, wherein the at least one processor is configured to assign the device to the PoP node at least in part based on a client policy.

9. The system of claim 7, wherein the at least one processor is configured to commission the PoP node at least in part based on a quality of service.

10. The system of claim 9, wherein the quality of service includes one metric of a group of metrics consisting of: latency, throughput, and roundtrip.

11. The system of claim 7, wherein performance information is received as feedback from the device, and the at least one processor is configured to assign the device to the PoP node at least in part based on the performance information.

12. The system of claim 7, wherein the PoP node is virtual or cloud-based.

13. A method, comprising:
   receiving a request including an internet protocol (IP) address of a device;
   identifying a geographic location of the device, at least in part based on the IP address;
   commissioning on demand a point of presence (PoP) node of a web gateway platform, wherein the PoP node provides web filtering, data loss prevention, email filtering, or another security service;
   acquiring load information about another PoP node, the commissioning at least in part based on the load information; and
   assigning the device to the PoP node, at least in part based on the load information.

14. The method of claim 13, wherein the assigning assigns the device to the PoP node at least in part based on a client policy.

15. The method of claim 13, wherein the commissioning commissions the PoP node at least in part based on a quality of service.

16. The method of claim 15, wherein the quality of service includes one metric of a group of metrics consisting of: latency, throughput, and roundtrip.

17. The method of claim 13, further comprising:
   receiving performance information as feedback from the device, wherein the assigning assigns the device to the PoP node at least in part based on the performance information.

18. The method of claim 13, wherein the PoP node is virtual or cloud-based.

* * * * *